(12) United States Patent
DeVlieg

(10) Patent No.: US 8,989,898 B2
(45) Date of Patent: Mar. 24, 2015

(54) ROBOTIC MANUFACTURING SYSTEM WITH ACCURATE CONTROL

(75) Inventor: Russell C. DeVlieg, Woodinville, WA (US)

(73) Assignee: Electroimpact, Inc., Mukilteo, WA (US)

( * ) Notice: Subject to any disclaimer, the term of this patent is extended or adjusted under 35 U.S.C. 154(b) by 159 days.

(21) Appl. No.: 12/603,851

(22) Filed: Oct. 22, 2009

(65) Prior Publication Data
US 2011/0098852 A1    Apr. 28, 2011

(51) Int. Cl.
*G06F 19/00* (2011.01)
*B25J 13/08* (2006.01)

(52) U.S. Cl.
CPC .................................... *B25J 13/088* (2013.01)
USPC ........... 700/245; 700/254; 700/258; 700/260; 700/261; 318/560; 318/568.11; 318/568.16; 318/568.17; 318/568.21

(58) Field of Classification Search
USPC ........ 700/245, 254, 258, 260, 261; 900/9, 14, 900/15; 318/560, 566, 568.11, 568.16, 318/568.17, 568.21
See application file for complete search history.

(56) References Cited

U.S. PATENT DOCUMENTS

| | | | | |
|---|---|---|---|---|
| 3,661,051 A | * | 5/1972 | Dunne et al. | 700/245 |
| 4,260,941 A | * | 4/1981 | Engelberger et al. | 318/568.2 |
| 4,433,382 A | * | 2/1984 | Cunningham et al. | 700/192 |
| 4,631,689 A | * | 12/1986 | Arimura et al. | 700/245 |
| 5,155,423 A | * | 10/1992 | Karlen et al. | 318/568.11 |
| 5,373,221 A | * | 12/1994 | McGee et al. | 318/568.11 |
| 5,380,978 A | * | 1/1995 | Pryor | 219/121.64 |
| 5,410,944 A | * | 5/1995 | Cushman | 91/520 |
| 5,581,166 A | * | 12/1996 | Eismann et al. | 318/568.22 |
| 6,037,733 A | * | 3/2000 | Genov et al. | 318/568.11 |
| 6,121,743 A | * | 9/2000 | Genov et al. | 318/568.11 |
| 6,258,007 B1 | * | 7/2001 | Kristjansson | 477/7 |
| 6,278,902 B1 | * | 8/2001 | Hashimoto et al. | 700/245 |
| 6,347,259 B1 | * | 2/2002 | Goldenberg et al. | 700/218 |
| 6,489,741 B1 | * | 12/2002 | Genov et al. | 318/561 |
| 6,519,860 B1 | * | 2/2003 | Bieg et al. | 33/503 |
| 6,668,466 B1 | * | 12/2003 | Bieg et al. | 33/503 |
| 6,845,295 B2 | * | 1/2005 | Cheng et al. | 700/245 |
| 6,919,701 B2 | * | 7/2005 | Nagata et al. | 318/568.12 |
| 7,184,858 B2 | * | 2/2007 | Okazaki et al. | 700/254 |
| 7,264,436 B2 | * | 9/2007 | Tillmann | 414/744.5 |
| 7,683,565 B2 | * | 3/2010 | Quaid et al. | 318/568.16 |
| 8,157,155 B2 | * | 4/2012 | Diez et al. | 228/44.3 |
| 2002/0077721 A1 | * | 6/2002 | Linn et al. | 700/193 |
| 2003/0025473 A1 | * | 2/2003 | Nagata et al. | 318/568.18 |
| 2005/0183533 A1 | * | 8/2005 | Tillmann | 74/490.03 |

(Continued)

OTHER PUBLICATIONS

Bernhard Jokiel, Jr., Lothar F. X. Bieg, and Mark Ensz, Development of an Independent Real-time Position Feedback Device for CNC Machining Operations, 2000, Proc. of the American Society for Precision Engineering Winter 2000 Annual Meeting, Scottsdale, Ariz., pp. 1-4.*

*Primary Examiner* — Khoi Tran
*Assistant Examiner* — Jaime Figueroa
(74) *Attorney, Agent, or Firm* — Jensen & Puntigam PS

(57) ABSTRACT

A robot mechanism for controlling the position of a machine tool in a large-scale manufacturing assembly includes six rotary axes and one linear axis. Secondary feedback systems are included on at least several of the axes. A controller receives secondary feedback information and uses it to control the position of the machine tool within an accuracy of ±0.3 mm.

10 Claims, 3 Drawing Sheets

(56) References Cited

U.S. PATENT DOCUMENTS

| | | | |
|---|---|---|---|
| 2007/0168081 A1* | 7/2007 | Shin et al. | 700/245 |
| 2007/0296366 A1* | 12/2007 | Quaid et al. | 318/568.16 |
| 2008/0258670 A1* | 10/2008 | Yoshikawa | 318/568.22 |
| 2009/0037022 A1* | 2/2009 | Teaford et al. | 700/254 |
| 2009/0076655 A1* | 3/2009 | Blondel et al. | 700/254 |
| 2009/0204258 A1* | 8/2009 | Tao et al. | 700/248 |
| 2009/0249606 A1* | 10/2009 | Diez et al. | 29/428 |
| 2009/0287352 A1* | 11/2009 | Geist et al. | 700/254 |
| 2010/0092032 A1* | 4/2010 | Boca | 382/103 |
| 2010/0181470 A1* | 7/2010 | Farley et al. | 250/252.1 |
| 2010/0191374 A1* | 7/2010 | Tsai et al. | 700/258 |

\* cited by examiner

ROBOTIC MANUFACTURING SYSTEM WITH ACCURATE CONTROL

TECHNICAL FIELD

This invention relates generally to robots used in the manufacture of large-scale assemblies, such as commercial airplanes and/or components for those assemblies, and more particularly concerns such a system for accurate control of the position of the work tool/end effecter portion of the robot.

BACKGROUND OF THE INVENTION

High accuracy is required for certain manufacturing functions with respect to various parts of commercial airplanes, including drilling and riveting functions. It is desirable that the end tool location be accurate to within ±0.1 to ±0.3 mm, or in some cases, even more precise. However, the machines to carry out those manufacturing functions are quite expensive and, although necessary to accomplish the desired accuracy, can be commercially burdensome for a manufacturer of such large-scale assemblies.

On the other hand, typical bent-arm, multi-axis type robots used typically in the manufacture of vehicles and similar articles do not require such high accuracy (typical accuracy of ±0.6 mm) but are significantly less expensive than the machines described above used in aircraft manufacture and the like. The robots use a plurality of rotary axes for tool positioning. The controller for the robot determines the desired position/angle of the robot's end tool/end effecter and runs an algorithm to determine the angle of each rotary joint, to properly position the tool. The positioning of the tool is produced by a feedback system using the position of the robot motor/motors. The best possible angular accuracy for such robots is determined by the backlash of the gearbox (at best 0.5 arcminute) and shaft windup, which refers to power transfer components such as shafts and belts. When this is multiplied by the large radial distance to the tool point, 200-1600 mm, a significant error, typically 0.03 to 0.25 mm, results from each joint. With such a positioning system, the overall accuracy of such a robot machine is not sufficient for the aircraft applications noted above and other manufacturing operations requiring high accuracy, such as medical device positioning, welding and machining operations, for example.

In the world of high accuracy machine tools, the XYZ position of the tool is accomplished through the use of linear axes, with secondary feedback. Zero, one or two rotary axes are used in the head of the machine tool, but secondary feedback is not typically used for the rotary axes. The distance to the tool point is quite short, so there is only a small effect in the XYZ positioning of the tool point from the rotary axes and secondary feedback on these axes has a negligible effect on improving accuracy.

Accordingly, it is desirable to be able to control the position of the tool/end effecter of a typical multi-rotary axis manufacturing robot with a significantly higher degree of accuracy then is presently possible with existing robots.

SUMMARY OF THE INVENTION

Accordingly, the system for controlling the position of an end tool in a large-scale manufacturing assembly comprising of a robot mechanism which includes at least three cascaded rotary axes of movement; a secondary feedback system on at least one of the rotary axes; and a controller for receiving secondary feedback information from said secondary feedback system or systems and using said secondary feedback information to control the position of the end tool.

BEST MODE FOR CARRYING OUT THE INVENTION

Figure 1:
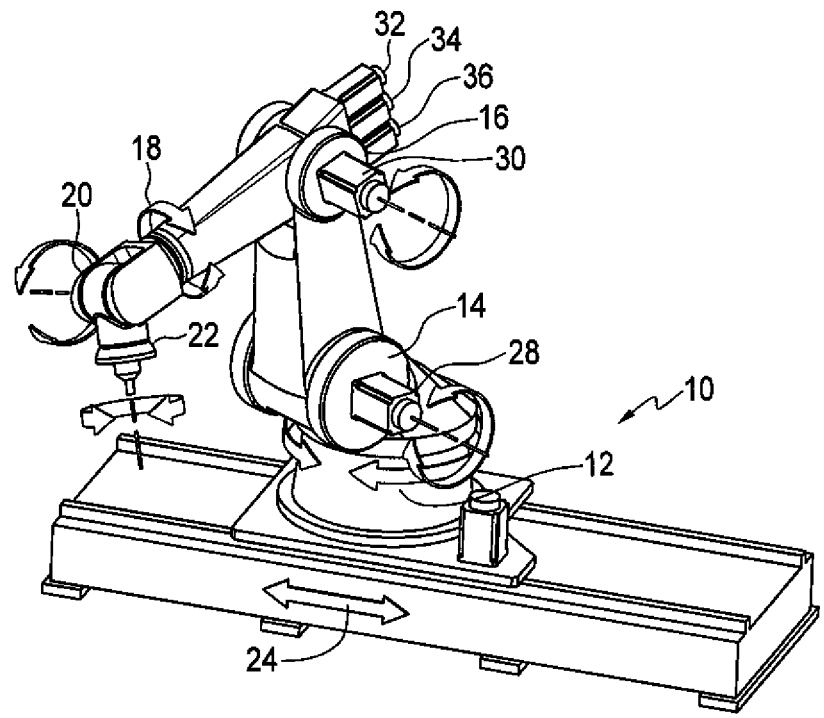
FIG. 1 is a general schematic diagram of an articulated machine robot having six rotary axes and one linear axis.
Figure 2:
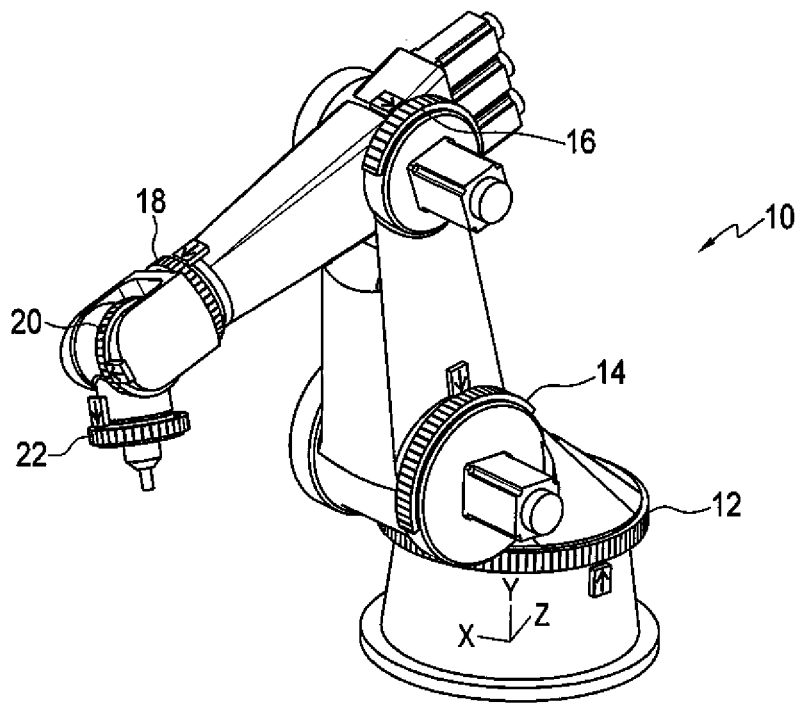
FIG. 2 is a schematic diagram similar to FIG. 1, showing secondary feedback assemblies on six rotary axes (linear axis not shown.)

FIGS. 1 and 2 show a manufacturing robot having six rotary axes with a joint following each axis. FIG. 1 also includes a linear axis. The robot, shown generally at 10, includes a first rotary axis 12, a second rotary axis 14, a third rotary axis 16, a fourth rotary axis 18, a fifth rotary axis 20 and a sixth rotary axis 22. The robot also includes a linear axis 24, as shown specifically in FIG. 1. The operation of the individual axes, allows the working end tool/end effecter to be accurately positioned within an XYZ Cartesian coordinate system (FIG. 2), and if sufficient additional axes exist, roll, pitch and yaw can also be controlled. FIGS. 1 and 2 show motors 28, 30, 32, 34 and 36 which separately operate axes 14, 16, 18, 20 and 22, respectively. The motor for axis 12 is not shown.

The inventor has discovered the significance of using secondary feedback on one or more of the rotary axes of robots to significantly improve the accuracy of otherwise conventional robots. Previously, it has been known from machine tools to use linear scales (with secondary feedback) on multiple axes to achieve high accuracy XYZ tool positioning. Secondary feedback for the one or two rotary axes (the head or tipping axis) of machine tools is not typically used and is not understood to add measurably to the accuracy of the machine tool. Hence, machine tool techniques for producing high tool accuracy do not provide significant insight relative to improving accuracy of robots with their relative long links (up to 2 meters in some cases) and their rotary axes. In robots, a link refers to the distance from one axis center to the next axis center. Machine tools typically have relatively short links, defined by the distance from the center of rotation of the rotary axis to the tool point. With robots, there has been no use or understanding to date of using secondary feedback from individual rotary axes to improve linear (XYZ) accuracy of the tool position.

In the embodiment shown, each separate axis includes a secondary feedback assembly, which could be a scale on an external portion of the axis or coupled to the pivot portion of the axis. An example of a secondary feedback assembly is shown on one rotary axis 20 in FIGS. 3 and 3A. Similar secondary feedback assemblies are shown on axes 12, 14, 16, 18 and 22 in FIG. 2. The particular secondary feedback assembly shown is an external scale, shown generally at 44, mounted on the rotary joint of axis 20. The external scale 44 is a linear tape scale wrapped around the axis joint. The scale can also be enclosed in a ring-like member 48. A detector 50 reads the rotary position of the axis by counting the lines in the scale which pass by the detector. The secondary feedback assembly could also be coupled to the axis pivot 56 in FIG. 3. The information from the detector is then applied to a feedback system, which uses the information to control the motors for the axes to locate the tool to the desired accuracy, at least ±0.25 mm for robots with a reach of 3½ meters. The accuracy will be even better with robots having shorter reaches.

Figure 3A:
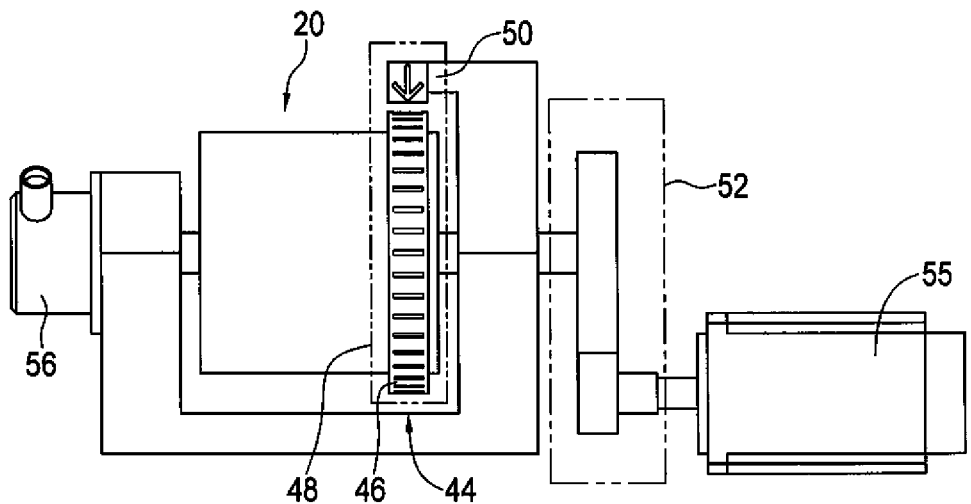
FIGS. 3 and 3A are diagrams showing one robot axis using the feedback system described herein for increased robot accuracy.
Figure 3:
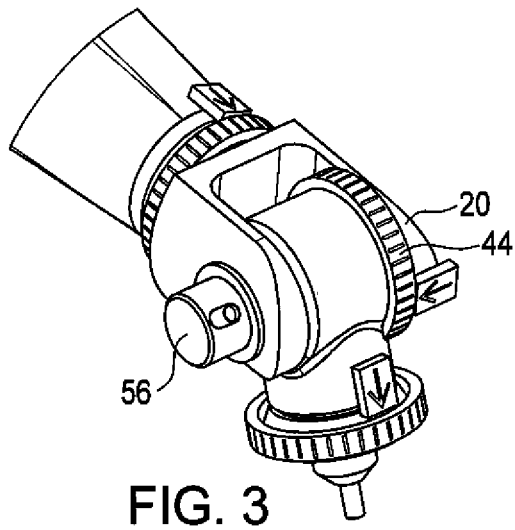

FIG. 3A also illustrates the structural arrangement for one axis 20. Axis 20 has a motor 55 associated therewith to provide the controlled movement of the rotary axis, as well as a power transmission 52 which connects the motor 50 to the axis. The power transmission is hidden within the external robot structure, and comprises couplings, shafts, U-joints, gears, belts and gear boxes, etc., to connect the motor 50 to the rotary joint. Although the arrangement of FIGS. 1 and 2 shows a separate motor for each rotary axis; with a separate short power transmission connecting each motor to separate axis joints, it is possible that a robot could have fewer motors, with power transmissions connecting motors to more than one axis joint.

Figure 7:
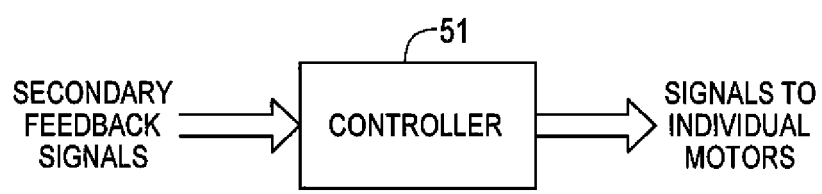
FIG. 7 is a simple block diagram showing the feedback control system.

FIG. 7 shows a simplified feedback arrangement involving signals from the secondary feedback assemblies on one or more of the axes to the robot controller 51. The controller then sends control signals to the motors as required to position the tool with the desired accuracy.

Figure 4:
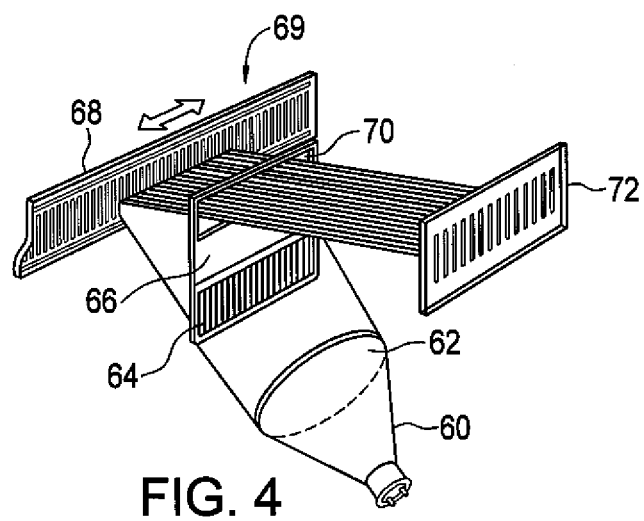
FIGS. 4-6 are diagrams showing various embodiments of secondary feedback assemblies used for a robot manufacturing system.
Figure 5:
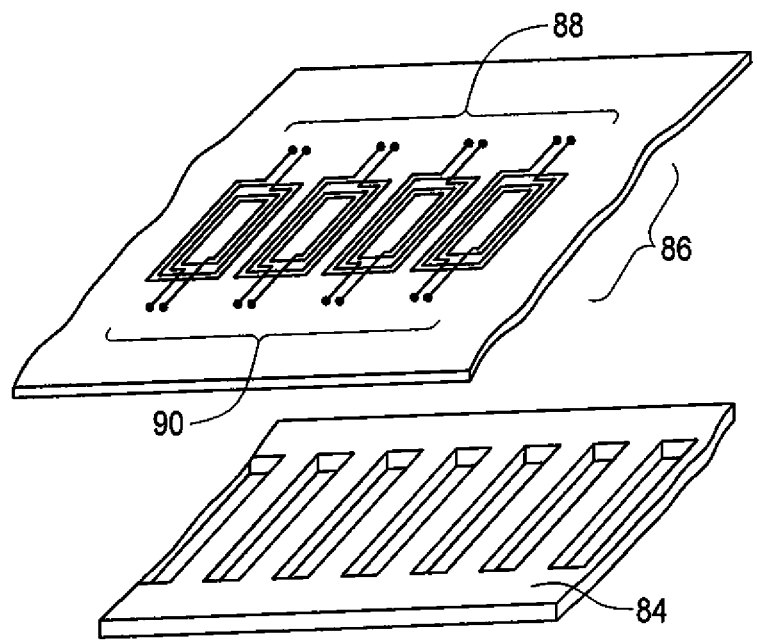
Figure 6:
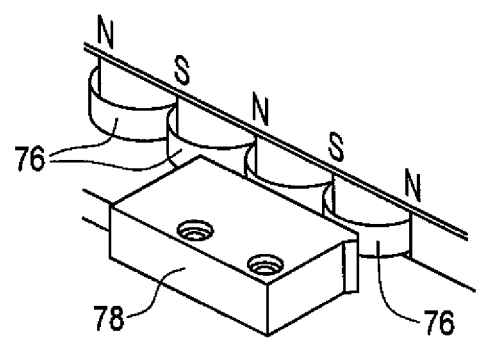

The encoders described above, either a linear tape is applied around the axis or a system coupled to the axis pivot can be implemented with a variety of position-detecting arrangements, including, but not limited to, optical, magnetic and inductive, as shown in FIGS. 4-6.

Referring to FIG. 4, an optical encoder assembly 69 includes a light source 60, such as an LED, the light being directed through a condenser lens 62 and then through an index grating 64 with a scanning reticle 66 onto encoder scale 68. Light is reflected off of the scale and back through a window 70 to a detector 72, which counts the number of lines as the axis is rotated. The information from the detector, referring to FIG. 7, is provided to the controller 51, which then provides corresponding signals back to the individual robot motors to position the robot tool with the desired accuracy to the preselected position for accomplishing the manufacturing function (drilling, riveting, etc.).

An inductive arrangement is shown in FIG. 5, and includes a measuring scale 84 and a microstructure 86 which includes primary windings 88 and secondary windings 90, so that as the measuring scale moves past the microstructure by movement of the axis joint, a pattern of electrical signals is developed on the secondary windings 90 indicative of the scale (and joint) movement. The information from the secondary windings is then applied to the controller for location of the robot tool, as with the other arrangements.

A magnetic arrangement is shown in FIG. 6. In this arrangement, the external scale includes a sequence of magnetic elements 76 with alternating north/south poles. Also included is a magnetic reader 78. As the rotary axis joint turns, the magnetic reader produces information which is forwarded to the controller 51, which in turn generates the motor signals necessary to accurately locate the robot tool.

The determination of axis position with a rotary/angle encoder on the axis pivot can also be accomplished with a resolver, which comprises a rotary transformer where the magnitude of the energy through the windings varies in a sinusoidal fashion as the shaft rotates. Typically, a resolver control transmitter will have one primary winding, referred to as the reference winding, and two secondary windings, referred to as the SIN and COS windings. The signal from the secondary windings provides a reliable, accurate indication of the change of position of the axis.

The above arrangements are examples of scale-type encoders which provide accurate positional information, typically within ±0.25 mm for robots which is suitable for many large-scale manufacturing operations with a reach in the range of 3½ meters.

The above system is advantageous, in that it permits the use of a multi-rotary axis and one linear axis robot which is significantly less expensive than apparatus which has heretofore been used to produce assembly operations requiring high accuracy, such as required in aircraft manufacture.

Each of the axes of the robot, as indicated above, will typically have a secondary feedback arrangement. This includes all of the rotary axes, as well as the linear axis. It should be understood, however, that it is not necessary that every axis have such a capability in order to provide significant advantages over the prior art systems. In fact, even having an encoder scale arrangement for secondary feedback on one axis, such as for instance the rotary axis 12, can result in an advantage in accuracy of the overall system.

Although a preferred embodiment has been disclosed for purposes of illustration, it should be understood that various changes and modifications and substitutions could be made in the preferred embodiment without departing from the spirit of the invention as defined by the claims which follow:

What is claimed is:

1. A system for accurate large-scale manufacturing assembly operations, comprising:
   a robot mechanism which includes more than three cascaded rotary axes of movement, wherein each rotary axis has a motor associated therewith for controlled movement of the axis, wherein the robot mechanism includes an end tool to accomplish large-scale manufacturing assembly operations;
   a secondary feedback system mounted in relation to the rotary joint of each of a plurality of the rotary axes, separate from and not connected to the motors associated with the axes, so as to read directly the rotary position of each axis; and
   an integrated controller in a feedback arrangement for receiving secondary feedback information from each of said secondary feedback systems and using said secondary feedback information to directly control the motors for each of said axes to accurately position the end tool to specified 3-dimensional linear Cartesian coordinates from the controller relative to a large-scale assembly and to produce at least one of roll, pitch and yaw angles of the end tool to accomplish the large-scale manufacturing operations.

2. The system of claim 1, wherein the system has an angular accuracy of 0.05 arcminute relative to a desired angle for each axis joint having secondary feedback.

3. The system of claim 1, wherein the robot mechanism has six rotary axes, at least two of which include secondary feedback systems.

4. The system of claim 1, wherein the manufacturing assembly is an aerospace assembly.

5. The system of claim 1, wherein the robot mechanism includes six rotary axes and one linear axis, all of which have secondary feedback systems.

6. The system of claim 1, wherein the secondary feedback system is an optical encoder.

7. The system of claim 1, wherein the secondary feedback system is an inductive encoder.

8. The system of claim 1, wherein the secondary feedback system is a magnetic encoder.

9. The system of claim 1, wherein the secondary feedback system is a rotary or angle encoder using a resolver.

10. A system for accurate large-scale manufacturing assembly operations, comprising:

a robot mechanism which includes more than three cascaded rotary axes of movement, wherein each rotary axis has a motor associated therewith for controlled movement of the axis, wherein the robot mechanism includes an end tool to accomplish large-scale manufacturing assembly operations;

a secondary feedback system mounted on the rotary joint of or at the output of each of a plurality of the rotary axes, without any gears or other transmission elements therebetween so as to read directly the rotary position of each axis; and an integrated controller in a feedback arrangement for receiving secondary feedback information from each of said secondary feedback systems and using said secondary feedback information to directly control the motors for each of said axes to accurately position the end tool to specified 3-dimensional linear Cartesian coordinates from the controller relative to a large-scale assembly and to produce at least one of roll, pitch and yaw angles of the end tool to accomplish the large-scale manufacturing operations.

* * * * *